United States Patent
Jiang et al.

(10) Patent No.: US 9,465,674 B2
(45) Date of Patent: Oct. 11, 2016

(54) DIRECT MEMORY (DMA) BASED ACCESS TO A DEVICE ON A REMOTE MACHINE USING STUB DRIVER AND BY SYNCHRONIZING THE DMA BUFFER

(75) Inventors: Zhefu Jiang, Beijing (CN); Shoumeng Yan, Beijing (CN); Gansha Wu, Beijing (CN)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 13/995,462

(22) PCT Filed: Mar. 30, 2012

(86) PCT No.: PCT/CN2012/073314
§ 371 (c)(1),
(2), (4) Date: Sep. 13, 2013

(87) PCT Pub. No.: WO2013/143121
PCT Pub. Date: Oct. 3, 2013

(65) Prior Publication Data
US 2013/0346978 A1    Dec. 26, 2013

(51) Int. Cl.
*G06F 9/455*    (2006.01)
*G06F 9/54*    (2006.01)
(Continued)

(52) U.S. Cl.
CPC ............ *G06F 9/54* (2013.01); *G06F 9/45533* (2013.01); *G06F 9/45558* (2013.01); *G06F 9/5077* (2013.01); *G06F 15/17331* (2013.01); *G06F 12/1081* (2013.01); *G06F 13/28* (2013.01); *G06F 2009/45575* (2013.01); *G06F 2009/45579* (2013.01)

(58) Field of Classification Search
None
See application file for complete search history.

(56) References Cited

U.S. PATENT DOCUMENTS

| 8,028,040 B1 | 9/2011 | Hobbs et al. |
| 2005/0108440 A1 | 5/2005 | Baumberger et al. |

(Continued)

FOREIGN PATENT DOCUMENTS

| CN | 101064629 A | 10/2007 |
| CN | 101425046 A | 5/2009 |
| CN | 102023960 A | 4/2011 |

OTHER PUBLICATIONS

International Preliminary Report on Patentability mailed Oct. 9, 2014 for International Application No. PCT/CN2012/073314, 9 pages.

(Continued)

*Primary Examiner* — Abu Ghaffari
(74) *Attorney, Agent, or Firm* — Schwabe, Williamson & Wyatt, P.C.

(57) ABSTRACT

Hosting, by a virtual machine manager of a local machine, a virtual machine having a device driver. The method may include obtaining, by the virtual machine manager, from a stub driver on the remote machine, information about the I/O device on the remote machine. The I/O device on the remote machine may be bound to the stub driver on the remote machine. The method may include instantiating, by the virtual machine manager, a virtual I/O device on the local machine corresponding to the I/O device on the remote machine. The method may include collaborating, by the virtual machine manager, with the stub driver on the remote machine to effectuate a real access to the I/O device on the remote machine for an access to the virtual I/O device by the device driver on behalf of a program on the local machine. Other embodiments may be described and claimed.

21 Claims, 5 Drawing Sheets

(51) Int. Cl.
    *G06F 9/50*   (2006.01)
    *G06F 15/173*  (2006.01)
    *G06F 12/10*   (2016.01)
    *G06F 13/28*   (2006.01)

(56) References Cited

U.S. PATENT DOCUMENTS

| | | | |
|---|---|---|---|
| 2006/0143311 A1* | 6/2006 | Madukkarumukumana | G06F 13/28 710/1 |
| 2007/0083862 A1* | 4/2007 | Wooldridge | G06F 12/1081 718/1 |
| 2007/0180449 A1* | 8/2007 | Croft | G06F 3/1415 718/1 |
| 2009/0006296 A1* | 1/2009 | Chen | G06F 15/163 706/42 |
| 2009/0024817 A1* | 1/2009 | Oved | G06F 13/28 711/170 |
| 2010/0023626 A1* | 1/2010 | Hussain | H04L 49/90 709/227 |
| 2010/0077019 A1 | 3/2010 | Holk et al. | |
| 2010/0306479 A1* | 12/2010 | Ezzat | G06F 15/167 711/147 |
| 2012/0110573 A1* | 5/2012 | Prashanth | G06F 9/465 718/1 |
| 2013/0138758 A1* | 5/2013 | Cohen | H04L 29/08549 709/212 |

OTHER PUBLICATIONS

International Search Report and Written Opinion mailed Jan. 17, 2013 for International Application No. PCT/CN2012/073314, 14 pages.

Extended European Search Report mailed Nov. 11, 2015 for European Patent Application No. 12872361.6, 8 pages.

David Rusling, "Chapter 8: Device Drives," Jan. 1, 1999, Retrieved from tldp.org/LDP/tlk/dd/drivers.html.

* cited by examiner

DIRECT MEMORY (DMA) BASED ACCESS TO A DEVICE ON A REMOTE MACHINE USING STUB DRIVER AND BY SYNCHRONIZING THE DMA BUFFER

CROSS REFERENCE TO RELATED APPLICATIONS

The present application is a national phase entry under 35 U.S.C. §371 of International Application No. PCT/CN2012/073314, filed Mar. 30, 2012, entitled "ACCESSING A DEVICE ON A REMOTE MACHINE", which designated, among the various States, the United States of America. The Specification of the PCT/CN2012/073314 Application is hereby incorporated by reference.

TECHNICAL FIELD

The present disclosure relates generally to the technical field of computing system. More specifically, the present disclosure relates accessing a device on a remote machine.

BACKGROUND INFORMATION

The background description provided herein is for the purpose of generally presenting the context of the disclosure. Unless otherwise indicated herein, the materials described in this section are not prior art to the claims in this application and are not admitted to be prior art by inclusion in this section.

Today, many users use multiple computing devices, such as tablets, smart phones, and personal computers. However, the current-generation computing devices do not enable a user to move seamlessly among the devices, e.g., between a laptop, smart phone, tablet or even car infotainment system.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Embodiments of the present disclosure may relate to accessing a device on a remote machine. To overcome issues associated with sharing resources between a local machine and a remote machine, a virtual machine manager (VMM) of the local machine may be configured to collaborate with a stub driver of the remote machine. The collaboration of the VMM with the stub driver may enable seamless access of a device on the remote machine by the local machine.

Advantageously, the systems and methods disclosed herein may enable hardware independent and software transparent approaches to accessing devices on remote machines from local machines.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
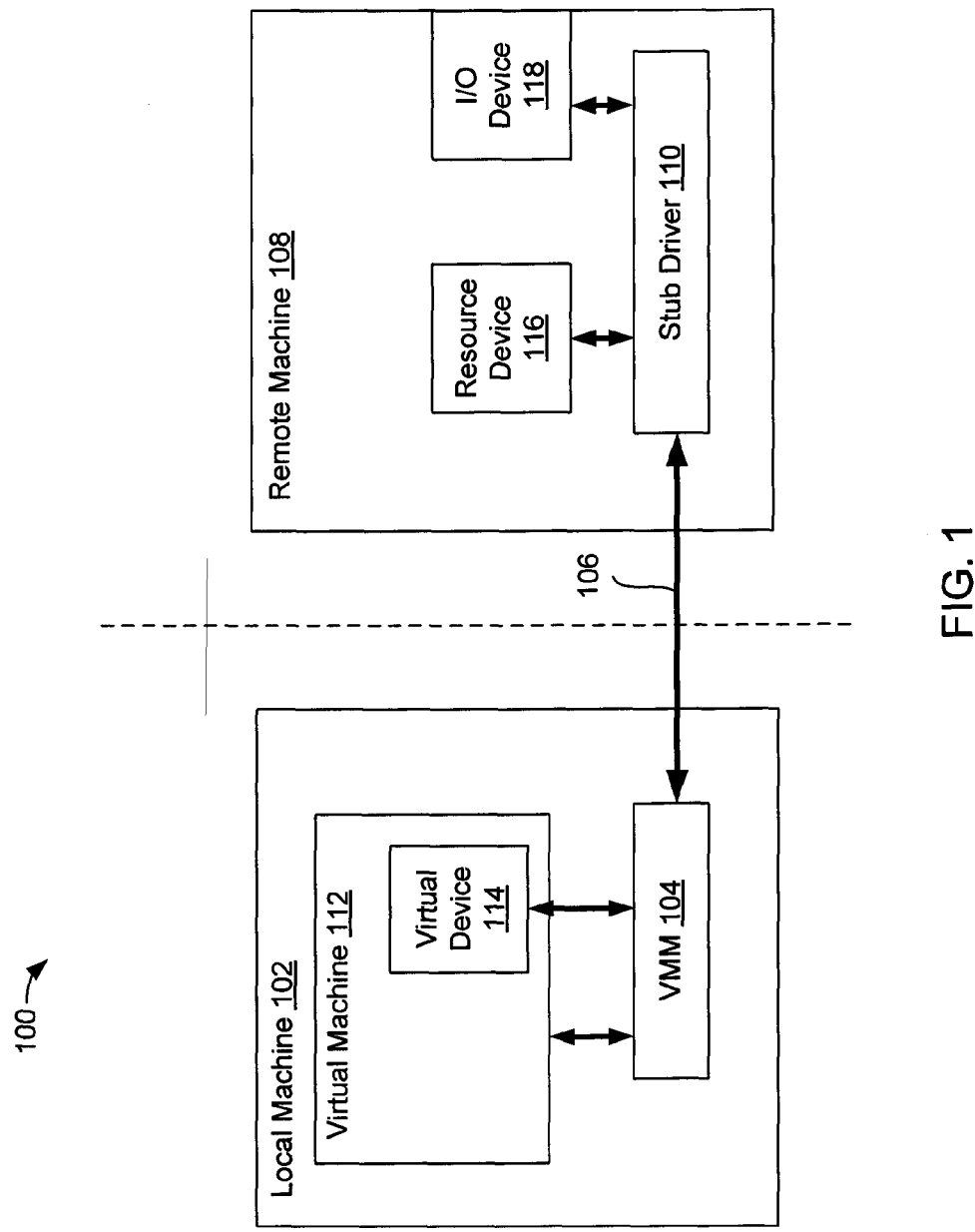
FIG. 1 is a block diagram of a computing continuum suitable for use to practice various embodiments of the present disclosure.

FIG. 1 illustrates a computing continuum 100 suitable for practicing embodiments of the present disclosure. Computing continuum 100 may include a local machine 102 running a virtual machine manager (VMM) 104 that may be coupled by a communication channel 106 to a remote machine 108 running a stub driver 110. Computing continuum 100 may provide a hardware independent and software transparent solution to enable local machine 102 to access one or more devices on remote machine 108 via communication channel 106. In particular, VMM 104 may communicate with stub driver 110 to transmit and receive instructions and/or other information for one or more devices that may be on remote machine 108. The communication channel 106 may be a channel of any one of any number of wired or wireless communication technologies, such as universal serial bus (USB), Ethernet, Bluetooth®, Wi-Fi®, or the like.

The term "compute continuum" as used herein refers to a federation or association of multiple computing machines, such as tablets, smart phones, laptops, desktops, car infotainment systems, and so forth, with seamless access of devices on one or more (or all) machines. While for ease of understanding, computing continuum 100 is illustrated with one local machine 102 and one remote machine 108, the present disclosure is not so limited. As it will be appreciated from the description to follow, the present disclosure may be practiced with computing continuum of two or more computing machines. Further, a local machine accessing a remote machine in one access scenario, may itself be a remote machine when accessed, in another access scenario.

As used herein, hardware independency may mean that the approach enables access to any kind of remote resources, e.g. resource devices or I/O devices, attached to any type of bus. As used herein, software transparency may mean that the disclosed approaches may be used with operating systems, device drivers, and upper-level applications without special modifications to the operating systems, device drivers, or upper-level applications.

Local machine 102 may be any one of a number of computing devices. For example, local machine 102 may be a personal computer, a tablet, a smart phone, a personal digital assistant, a desktop, a laptop, a game console, or other similar computing device. Local machine 102 may run a full software stack including an operating system, device drivers, and applications. Local machine 102 may run one or more applications that may benefit from being able to access one or more devices or resources located on remote machine 108. For example, local machine 102 may run a graphics intensive application which may benefit from access to a graphical processing unit (GPU) that may be on remote machine 108. As another example, local machine 102 may execute a network-based application that may benefit from access to a network interface device on remote machine 108. According to various embodiments, local machine 102 may access one or more devices on remote machine 108 by running VMM 104 incorporated with the teachings of the present disclosure.

VMM 104 may be configured to manage input/output (I/O) data, device drivers, virtual machines, and/or operating systems on local machine 102. The VMM may either be purely software-based or purely hardware-based or a mixture of both. In embodiments, VMM 104 may be configured to enable an OS, e.g., guest OS, to transparently access one or more remote devices on remote machine 108. VMM 104 (in cooperation with stub driver 110 of remote machine 108) may be configured to enable one or more applications on local machine 102 to access one or more devices of remote machine 108. For example, VMM 104 may host virtual machine 112, which may run one or more operating systems, device drivers, and applications for local machine 102. VMM 104 may also initiate or set up virtual device 114 to facilitate access to one or more devices of remote machine 108 for use by virtual machine 112 or for use by device drivers or applications executed by virtual machine 112. In embodiments, virtual device 114 may provide, a guest OS running on virtual machine 112, the illusion that the guest OS is accessing a real device on local machine 102.

VMM 104 may configure virtual device 114 to emulate a resource device 116 or an I/O device 118 (remote devices 116, 118), according to various embodiments. In particular, VMM 104 may configure virtual device 114 to include, or have access to, I/O space information, direct memory access (DMA) information, and/or interrupt information related to remote devices 116, 118. According to one embodiment, VMM 104 may configure several instances of virtual device 114 to concurrently emulate both remote devices 116, 118 and/or other remote devices on remote machine 108. By configuring virtual device 114 to emulate remote devices 116, 118, VMM 104 may enable virtual machine 112 to access virtual device 114 as if one or more of remote devices 116, 118 were installed on local machine 102, enabling local machine 102 and remote machine 104 to form a computing continuum.

VMM 104 may configure virtual device 114 to emulate remote devices 116, 118 by collaborating with stub driver 110. In other words, VMM 104 may selectively and/or periodically transfer data, instructions, and/or other information to and from stub driver 110 in response to predefined events or tasks. For example, to initialize virtual device 114, VMM 104 may request I/O configuration information from stub driver 110 for remote devices 116, 118 located on remote machine 108 to facilitate I/O address space-based access of the remote devices. On receiving the response containing the requested I/O configuration information for remote devices 116, 118, VMM 104 and/or virtual machine 112 may choose one or more of remote devices 116, 118 to emulate with virtual device 114. In particular, VMM 104 may first select which one of remote devices 116, 118 to import, then VMM 104 may send a request in order to receive configuration information of the selected device. As another example of collaborating, VMM 104 may share, with stub driver 110, direct memory access (DMA)-based information that is associated with virtual device 114 and the corresponding one of remote devices 116, 118. As another example of collaborating, VMM 104 may be configured to receive interrupts or interrupt related information from stub driver 110 that may be associated with remote devices 116, 118.

In embodiments, resource device 116 may be a number of resource devices of remote machine 108. For example, resource device 116 may be a graphical processing unit (GPU), and VMM 104 may configure virtual device 114 to associate with local shadow copies of I/O space information, interrupt handling, and buffer operations of the GPU.

In embodiments, I/O device 118 may be any one of a number of I/O devices included on remote machine 108. For example, I/O device 118 may be a touch screen interface, a global positioning system (GPS) unit, a network interface card, a display port, a communication port, one or more sensors, one or more communication devices, or the like.

Remote machine 108 may be configured to enable stub driver 110 to obtain instructions, data, or other information from one or more devices on remote machine 108 to facilitate access to the one or more devices by local machine 102. For example, remote machine 108 may bind stub driver 110 to resource device 116 or I/O device 118. Binding stub driver 110 to resource device 116 or I/O device 118 may enable stub driver 110 to access communication and/or data buses on remote machine 108. Binding stub driver 110 to resource device 116 or I/O device 118 may enable stub driver 110 to provide data or instructions directly to resource device 116 or I/O device 118. According to various embodiments, stub driver 110 may bind to all I/O devices of remote machine 108 to be exported to the local machine 102. In embodiments, remote machine 108 may bind stub driver 110 to an I/O device to facilitate routing of interrupts and/or I/O space access of resource device 116 or I/O device 118 to local machine 102. According to other embodiments, remote machine 108 may bind stub driver 110 to resource device 116 or I/O device 118 to facilitate routing I/O space information and/or DMA-related information to local machine 102.

In summary, the VMM 104 may collaborate with stub driver 110 to enable virtual device 114 to emulate remote devices 116, 118. Advantageously, VMM 104 may configure virtual device 114 to interface with virtual machine 112 or device drivers and/or applications run by virtual machine 112 as if virtual device 114 were resource device 116 or I/O device 118 installed on local machine 102. Accordingly, VMM 104 may enable hardware independent and software transparent access to a remote device from local machine 102. Advantageously, stub driver 110 may operably interface with remote devices 116, 118 to obtain configuration information, to update DMA information, and/or to handle interrupt processing for remote devices 116, 118. These actions may be performed by stub driver 110 without redesign of, or permanent modification to, remote devices 116, 118. Accordingly, stub driver 110 may enable hardware independent and software transparent access to remote devices 116, 118, according to various embodiments.

Figure 2:
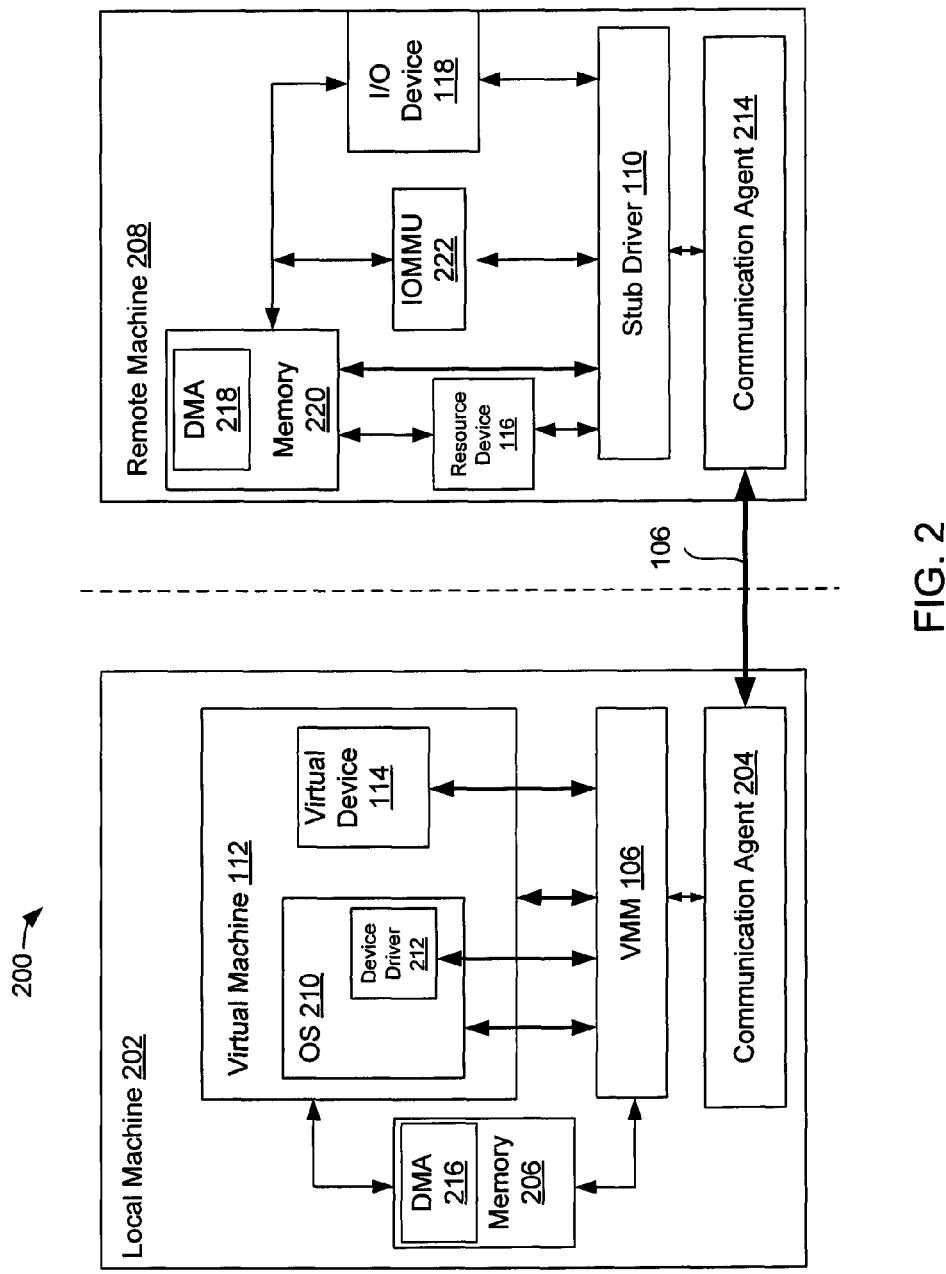
FIG. 2 is a block diagram of a computing continuum, according to various embodiments of the present disclosure.

FIG. 2 shows a computing continuum 200 configured to enable local machine 202 to access remote devices 116, 118 of remote machine 208, according to embodiments of the disclosure.

Local machine 202 may include many features similar to local machine 102 and may be configured to effectuate a real access of remote devices 116, 118 by enabling VMM 104 to collaborate with stub driver 110. Local machine 202 may include a communication agent 204, a memory 206, and may run an operating system (OS) 210 and a device driver 212 inside a virtual machine 112.

Communication agent 204 may be configured to communicate with a communication agent 214 via communication channel 106. Communication agent 204 and communication agent 214 may each be configured to establish a wired or wireless connection between local machine 202 and remote machine 208. In embodiments, communication agent 204 and communication agent 214 are configured to establish communication channel 106 via one of a universal serial bus (USB) protocol, an Institute of Electrical and Electronics Engineers (IEEE) 802.1x wireless protocol, or the like. In embodiments, VMM 104 and stub driver 110 may use communication agent 204 and communication agent 214 to exchange data, instructions, interrupts, or other information related to I/O space configurations, DMA buffers, and interrupt handling.

Memory 206 may be coupled to VMM 104 and may be configured to facilitate various types of collaboration between VMM 104 and stub driver 110. According to various embodiments, memory 206 may refer to general physical address space, such as I/O address space and RAM address space.

In embodiments, memory 206 may be configured to support a setup phase of the I/O space for remote devices 116, 118. Device driver 212 may access an I/O space of an I/O device through port I/O, or MMIO (memory mapped I/O). To input or output to a remote device, the I/O address space of a remote device may be locally shadowed in memory 206 to provide OS 210 and device driver 212 with a transparent illusion that one of remote devices 116, 118 is installed on local machine 202. Then, to input or output to one of remote devices 116, 118, I/O operations may be redirected to the remote machine 208 through communication agents 204 and 214. In embodiments, VMM 104 may configure memory 206 to support the setup phase of I/O configuration space for remote devices 116, 118. In particular, VMM 104 may shadow the I/O configuration space of remote devices 116, 118 in portions of memory 206 allocated for use by virtual machine 112. Then a base address register of I/O device 118, for example, may be exposed directly or exposed after some translation. Because virtual machine 112 may directly access the I/O configuration space of local machine 202, the local shadow of I/O space information may provide device driver 212 with a transparent illusion that one of remote devices 116, 118 is locally installed on local machine 202.

VMM 104 may also configure memory 206 to support a runtime I/O passthru for remote devices 116, 118. When virtual machine 112 issues I/O operations to virtual device 114, VMM 104 may trap the I/O operations from execution on local machine 202. After trapping the I/O operations, VMM 104 may forward the I/O operations to stub driver 110 running on the remote machine. The stub driver 110 may then execute the I/O operations on a respective one of remote devices 116, 118 and return the result to VMM 104.

VMM 104 may cause the result to be stored in an I/O space in memory 206. For an I/O read, the results fetched from remote device 116 or 118 may be stored in memory 206 or may be fed directly into virtual machine 112.

VMM 104 may configure memory 206 to support various DMA operations to remote access of remote devices 116, 118. The herein disclosed DMA operations contribute to enabling computing continuum 200 to overcome I/O resource sharing challenges associated with traditional approaches to device sharing between a local machine and a remote machine.

In a single machine environment, a DMA operation may involve a DMA buffer for data movement between a memory and a device associated with the DMA buffer. In computing continuum 200, local machine 202 may have a DMA buffer 216 that may be allocated in memory 206. Remote machine 208 may also have a DMA buffer 218 allocated in memory 220 of remote machine 208. According to embodiments, the remote DMA buffer 218 may be maintained by the stub driver 110 on remote machine 208. This remote DMA buffer 218 may be visible to the device and real DMA transactions may be performed using this buffer. Local DMA buffer 216 may be allocated by device driver 212 from the OS 210 and may be managed by VMM 104. Local DMA buffer 216 may be visible to the local SW stack of local machine 202, so that all DMA transactions appear to be performed using DMA buffer 216 from the vantage point of virtual machine 112 and the components hosted by virtual machine 112. Both local DMA buffer 216 and remote DMA buffer 218 may be regarded as a shadow of each other, and VMM 104 may work with stub driver 110 to keep the DMA buffers 216, 218 synchronized with each other. As a result, device driver 212 operates as though all DMA operations occur on a local device while the real device is on the remote machine.

In embodiments, DMA buffer operations may be difficult to handle because some DMA operations (such as those associated with PCI or PCI-express agents) may be triggered by device-specific commands which may be impractical to be intercepted and decoded one by one. (PCI=Peripheral Component Interconnect.) This may be different from other cases (such as USB or SCSI agents) where all operations are standard and can be decoded. (USB=Universal Serial Bus; SCSI=Small Computer System Interface.) According to various embodiments, to solve the issue of decoding individual commands, a novel technique for synchronizing local and remote DMA buffers 216, 218 is disclosed hereafter.

Before synchronizing DMA buffers 216, 218 in a runtime phase of DMA operation, the buffers may be set up. VMM 104 may track all DMA buffers currently active for a device by intercepting local OS 210 DMA mapping APIs. DMA mapping APIs may provide the local DMA buffer 216 information, such as the starting address, the size, and the DMA type (e.g., DMA READ or DMA WRITE). VMM 104 may then report the DMA mapping to remote machine 208 so that stub driver 110 may allocate remote DMA buffer 218. VMM 104 and stub driver 110 may collaboratively set up a translation table 222.

Translation table 222 may include a mapping between the remote and local DMA buffers 216, 218. Translation table 222 may be called an input/output memory management unit (IOMMU) 222. IOMMU 222 may be implemented in pure SW or may be accelerated by chipset firmware. Remote DMA buffer 218 may then be synchronized with local DMA buffer 216 so that DMA buffers 216, 218 may be initially synchronized.

During runtime phase, synchronizing DMA buffers 216, 218 may consume overhead processing cycles, so synchronizing DMA buffers 216, 218 less frequently may be more processing efficient. One approach may be to configure VMM 104 and stub driver 110 to synchronize DMA buffers 216, 218 when VMM 104 intercepts a read/write access to either one of DMA buffers 216, 218. This approach may produce non-trivial runtime overhead. Another approach may be to buffer local DMA buffer 216 reads/writes in read/write caches, and synchronize the caches when an error may otherwise occur. Embodiments of example approaches are discussed below for the DMA read and DMA write, respectively.

In embodiments, all writes to local DMA buffer 216 may be synchronized to the remote machine. However, according to one embodiment, instead of synchronizing remote DMA buffer 218 to local DMA buffer 216 upon each memory write to local DMA buffer 216, VMM 104 may buffer the memory writes into a write cache. When one of a set of preconditions occurs, VMM 104 may pause virtual machine 112 and send the write cache to stub driver 110. Stub driver 110 may populate remote DMA buffer 218 based on the content of the write cache, then VMM 104 may resume virtual machine 112. In embodiments, VMM 104 may synchronize when:

a. VMM 104 detects that the local virtual machine 112 is reading/writing from/to I/O registers or device I/O memory of remote devices 116, 118 (which may potentially trigger a DMA write transaction); or b. VMM 104 detects that an interrupt from one or more of remote devices 116, 118 arrives (which may indicate that one of remote devices 116, 118 wants to read more data).

According to various embodiments, the duration of a pause of virtual machine 112 caused by synchronizing write caches may be reduced by synchronizing the DMA buffers 216 and 218 whenever possible (e.g. when there's free bandwidth on the communication channel 106), because when virtual machine 112 is paused, it may be largely probable that most of the write caches may have already been synchronized to the remote DMA buffer 218. Additionally, synchronizing whenever it is possible to do so may guarantee the correctness of a device's behavior because some devices use bits in the DMA memory to perform synchronization (e.g., arbitration of buffer ownership) with the OS.

In embodiments, contents of remote DMA buffer may be fetched if virtual machine 112 reads the corresponding local DMA buffer 216. According to one embodiment, instead of fetching upon each memory read of local DMA buffer 216, VMM 104 may fetch the whole DMA buffer 218 on a first read to form a local read cache, so that subsequent reads of DMA buffer 216 may be local without receiving updates from remote machine 208. In embodiments, VMM 104 may invalidate the cache to ensure that the local DMA buffer 216 is always up to date when:

a. VMM 104 detects that the local virtual machine 112 is reading/writing from/to I/O registers or device I/O memory of one of remote devices 116, 118 (which may potentially trigger a DMA write transaction); or b. VMM 104 detects that an interrupt of one of remote devices 116, 118 arrives (which may indicate that the DMA buffer 216 was rewritten so that the read cache may be invalid).

According to various embodiments, the read cache may be periodically invalidated because various bits of the DMA buffer 216 may be used to perform synchronization between the device and the OS (e.g., arbitration of buffer ownership). The interval of invalidating read cache may be made configurable so that improved or optimized performance can be achieved for various devices.

Accordingly, memory 206 may be configured to facilitate various types of collaboration between VMM 104 and stub driver 110 by providing DMA buffer space for the purpose of maintaining and updating a local DMA buffer 216. Additionally, according to the techniques described above, multiple DMA buffers may be utilized and synchronized to enable VMM 104 and stub driver 110 to make remote devices 116, 118 available to local machine 202.

Transitioning away from a discussion of DMA buffer synchronization, VMM 104 and stub driver 110 may collaborate to enable virtual device 114 to emulate remote devices 116, 118 by coordinating interrupt handling. When one of remote devices 116, 118 triggers an interrupt, stub driver 110 may forward the interrupt to VMM 104. In response to receipt of the interrupt, VMM 104 may inject an interrupt for virtual machine 112, so that device driver 212 may handle the interrupt.

More than one type of interrupt may be available, depending upon the type of hardware employed by computing continuum 200. Whether the interrupt is message signaled interrupts (MSI) or traditional INTx, the interrupts which remote devices 116, 118 may raise are enumerated by parsing a configuration space of the device, e.g., PCI configuration space. To handle a traditional INTx, the interrupt at remote machine 208 may be disabled until device driver 212 has handled the interrupt. To handle a MSI, because they may behave like edge-triggered interrupts, a mirrored interrupt may be injected to local virtual machine 112, without disabling it. According to embodiments, because configuration space of the remote devices 116, 118 has been mirrored in virtual machine 112, OS 210 and device driver 212 may correctly bind the interrupt handler.

If one of remote devices 116, 118 raises an interrupt at remote machine 208, VMM 104 may simulate the interrupt in the local virtual machine 112. Then device driver 212 in local virtual machine 112 may handle the device interrupt as if the device were plugged in local machine 202.

The above disclosed continuums of FIG. 1 and FIG. 2 may be implemented in accordance with various embodiments. For example, stub drive 110 may bind to a PCI device such as a USB enhanced host controller interface host controller (EHCI HC), which is a typical PCI device. In other embodiments, other PCI-based, industry standard architecture (ISA) bus-based or advanced microcontroller bus architecture (AMBA) bus-based devices may be used to implement stub driver 110.

Figure 3:
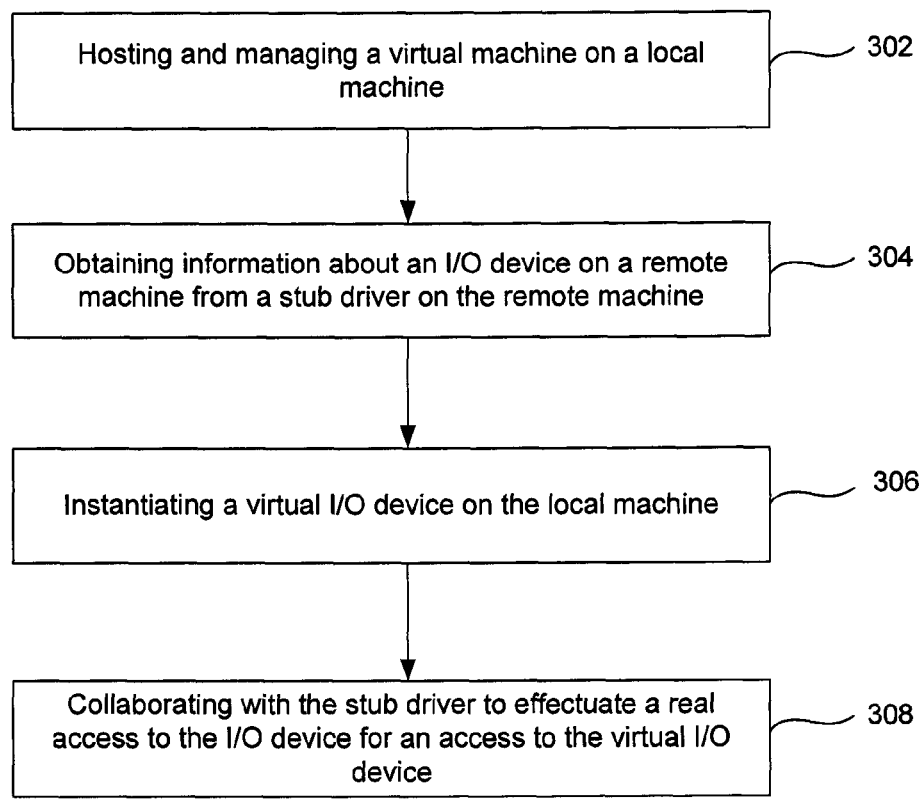
FIG. 3 is a flow diagram of an access method at local computing machine side, according to various embodiments of the present disclosure.

FIG. 3 shows a flow diagram of an access method, on the local machine side, according to embodiments.

At block 302, a virtual machine manager of the local machine may perform hosting and managing a virtual machine on the local machine.

At block 304, the virtual machine manager may perform obtaining information about an I/O device on a remote machine (e.g. the machine to be described with reference to FIG. 4) from a stub driver on the remote device.

At block 306, the virtual machine manager may perform instantiating a virtual I/O device on the local machine.

At block 308, the virtual machine manager may perform collaborating with the stub driver to effectuate a real access to the I/O device for an access to the virtual I/O device.

Figure 4:
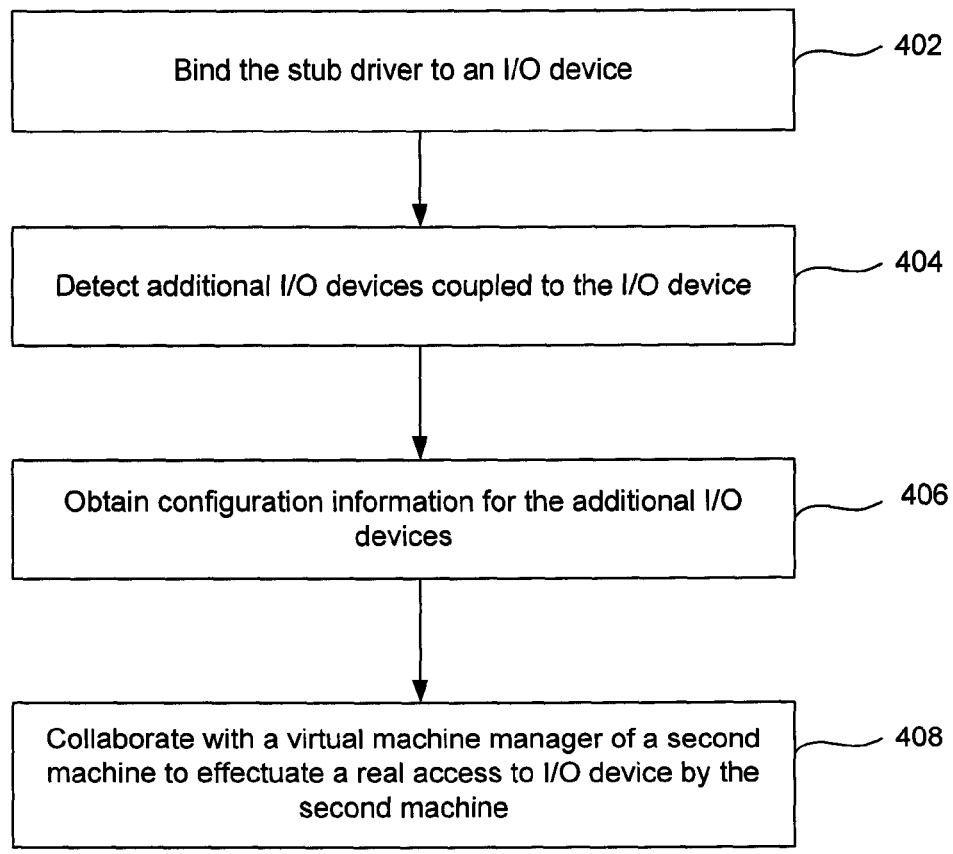
FIG. 4 is a flow diagram of an access method at remote computing machine side, according to various embodiments of the present disclosure.

FIG. 4 shows a flow diagram of an access method, on the remote machine side, according to embodiments.

At block 402, a stub driver of the remote machine may bind the stub driver to an I/O device of the remote machine.

At block 404, the stub driver may detect additional I/O devices coupled to the I/O device.

At block 406, the stub driver may obtain configuration information for the additional I/O devices.

At block 408, the stub driver may collaborate with a virtual machine manager of a second machine (e.g., local machine of FIG. 3) to effectuate a real access to an I/O device by the second machine.

Figure 5:
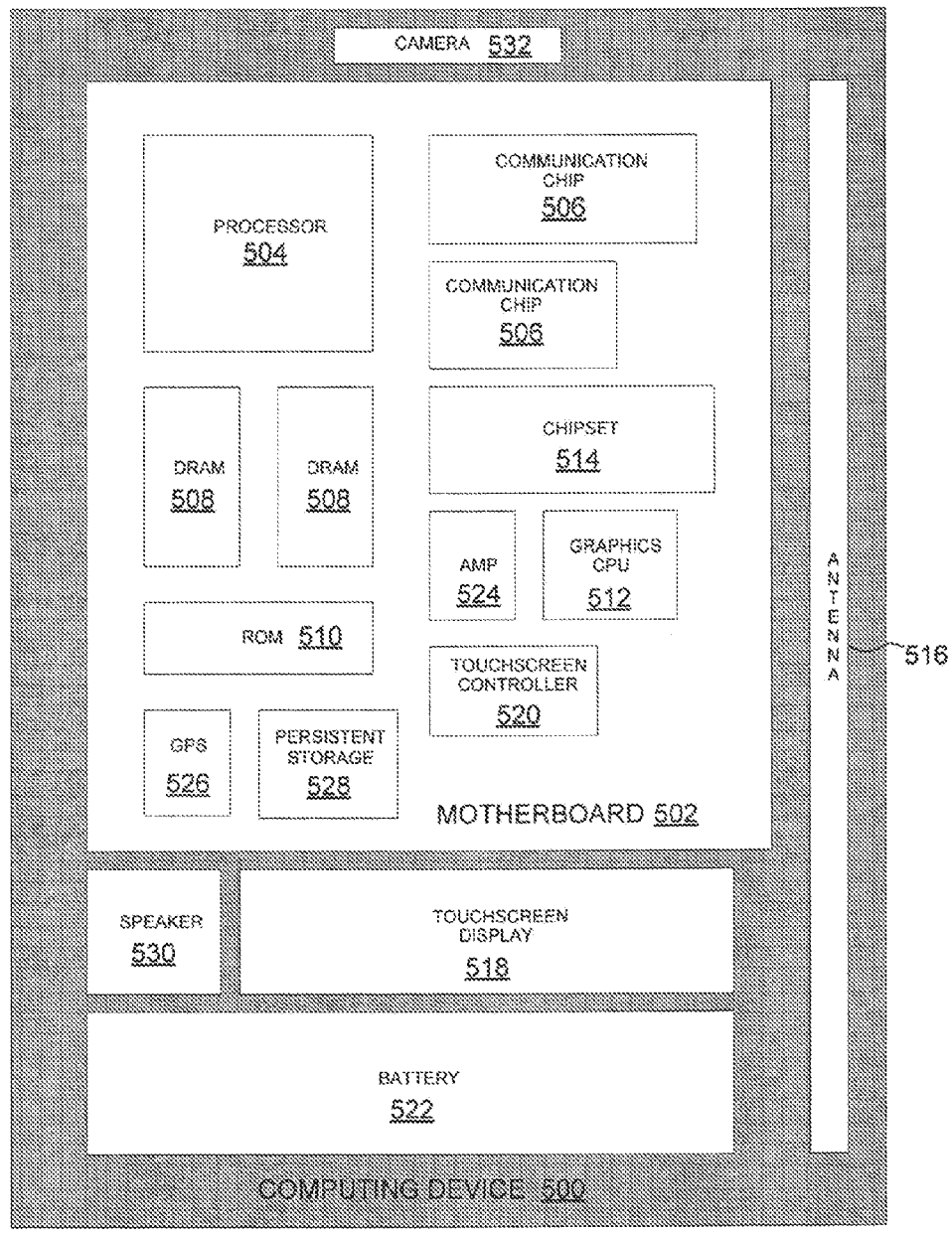
FIG. 5 is a block diagram of a computing machine incorporated with various embodiments of the present disclosure.

FIG. 5 illustrates a computing device 500 in accordance with one implementation of the invention. Computing device 500 can be any one of local and remote machines 102, 202, 108, and 208 described in FIGS. 1-2. Computing device 500 may house a board 502. Board 502 may include a number of components, including but not limited to a processor 504 (having one or more processor cores) and at least one communication chip 506. Processor 504 may be physically and electrically coupled to the board 502. Processor 504 may execute instructions configured to perform some or all of the operations of the method of FIG. 3 or execute the instructions configured to perform some or all of the operations of the method of FIG. 4, according to various embodiments. In some implementations at least one communication chip 506 may also be physically and electrically coupled to the board 502. In further implementations, the communication chip 506 may be part of the processor 504.

Depending on its applications, computing device 500 may include other components that may or may not be physically and electrically coupled to the board 502. These other components may include, but are not limited to, volatile memory (e.g., DRAM 508), non-volatile memory (e.g., ROM 510), and persistent storage 528 (such as flash memory or disk storage). Volatile memory 508, non-volatile memory 510 and persistent storage 528 may be employed to store the working and persistent copies of the instructions to be executed by processor 504 to enable computing device 500 to perform the method operations of FIGS. 3 and/or 4. These other components may further include a graphics processor 512, a digital signal processor (not shown), a crypto processor (not shown), a chipset 514, an antenna 516, a display (not shown), a touchscreen display 518, a touchscreen controller 520, a battery 522, an audio codec (not shown), a video codec (not shown), a power amplifier (AMP) 524, a global positioning system (GPS) device 526, an accelerometer (not shown), a gyroscope (not shown), a speaker 530, a camera 532, and a mass storage device (not shown) (such as hard disk drive, compact disk (CD), digital versatile disk (DVD), and so forth). Any of these components may be one of a resource device 116 or an I/O device 118, according to various embodiments.

Communication chip 506 enables wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. Communication chip 506 may implement any of a number of wireless standards or protocols, including but not limited to Wi-Fi (IEEE 802.11 family), WiMAX (IEEE 802.16 family), IEEE 802.20, long term evolution (LTE), evolution—data optimized (Ev-DO), evolved high speed packet access (HSPA+), high speed downlink packet access (HSDPA+), high speed uplink packet access (HSUPA+), enhanced data rates for GSM evolution (EDGE), global system for mobile (GSM), general packet radio service (GPRS), code division multiple access (CDMA), time division multiple access (TDMA), digital enhanced cordless telecommunications (DECT), Bluetooth, derivatives thereof, as well as any other wireless protocols that are designated as 3G, 4G, 5G, and beyond. Computing device 500 may include a number of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others. According to embodiments, communication chip 506 may be I/O device 118 of FIGS. 1-2.

Processor 504 of the computing device 500 includes an integrated circuit die packaged within the processor 504. In some implementations of the disclosure, the integrated circuit die of the processor includes one or more devices operably configured according to embodiments of the disclosure. The term "processor" may refer to any device or portion of a device that processes electronic data from registers and/or memory to transform that electronic data into other electronic data that may be stored in registers and/or memory.

Communication chip 506 also includes an integrated circuit die packaged within the communication chip 506. In accordance with another implementation of the disclosure, the integrated circuit die of the communication chip includes one or more devices, such as I/O devices 118, configured to communicate with external devices and/or systems.

In further implementations, another component housed within the computing device 500 may contain an integrated circuit die that includes one or more devices, such as processor cores, cache and one or more memory controllers.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 500 may be any other electronic device that processes data.

Specific features of any of the above described embodiments may be fully or partially combined with one or more other embodiments, either wholly or partially, to form new embodiments of the disclosure.

Following are additional example embodiments of the disclosure.

According to various example embodiments, a computer readable medium may have a number of instructions configured to enable a local machine, in response to execution of the instructions by the local machine, to operate a virtual machine manager to host and manage a virtual machine on the local machine. The virtual machine may include a device driver. The instructions may enable a local machine to obtain information about a resource on a remote machine from a stub driver on the remote machine. The resource on the remote machine may be bound to the stub driver on the remote machine. The instructions may enable the local machine to instantiate a virtual resource on the local machine corresponding to the resource on the remote machine, and collaborate with the stub driver on the remote machine to effectuate a real access to the resource on the remote machine for an access to the virtual resource by the device driver on behalf of a program on the local machine.

In embodiments, the resource may include an I/O device, and obtaining information about the I/O device may include obtaining configuration information about the I/O device from the stub driver.

In embodiments, the virtual machine manager may create on the local machine a shadow copy of an I/O address space of the I/O device based on the obtained information, to facilitate I/O address space-based access of the I/O device.

In embodiments, the virtual machine manager may execute an initialization routine of the device driver on the local machine to effectively initialize the I/O device for access, based at least in part on the shadow copy of the I/O address space.

In embodiments, the virtual machine manager may capture an I/O instruction issued by the virtual machine, transmit the I/O instruction to the stub driver for operation on the I/O device to obtain an I/O result, and receive the I/O result from the stub driver.

In embodiments, the virtual machine manager may pause the virtual machine after a capture of an I/O instruction of the virtual machine.

In embodiments, the virtual machine manager may receive, from the stub driver, an interrupt notification of the I/O device.

In embodiments, the virtual machine manager may cause the device driver to interrupt the virtual machine, in response to receipt of the interrupt notification of the I/O device.

In embodiments, the virtual machine manager may interrupt the virtual machine in a manner that enables the virtual machine to handle the interrupt notification of the I/O device as if the I/O device was directly connected to a local bus of the local machine.

In embodiments, the virtual machine manager may transmit a disable instruction to the stub driver to temporarily disable interrupts on the remote machine, in response to receipt of the interrupt notification of the I/O device.

In embodiments, the virtual machine manager may allocate a local direct memory access (DMA) buffer on the local machine, to facilitate DMA based access of the I/O device.

In embodiments, the virtual machine manager, as part of facilitation of DMA based access of the I/O device, may update the local DMA buffer with results of DMA based access of the I/O device.

In embodiments, the virtual machine manager, as part of facilitation of DMA based access of the I/O device, may synchronize the local DMA buffer with a corresponding DMA buffer of the remote machine.

In embodiments, the virtual machine manager may cache write access operations on the local DMA buffer, and may transmit the cached write access operations to the stub driver, in response to either a DMA access associated data transfer between the virtual machine and the I/O device or receipt of a DMA access associated interrupt notification of the I/O device from the stub driver.

In embodiments, the virtual machine manager may pause operation of the virtual machine after the cached write access operations on the DMA buffer are transmitted, and may resume operation of the virtual machine in response to receipt of a synchronize notification from the stub driver that indicates that the corresponding DMA buffer on the remote machine has been synchronized with the local DMA buffer.

In embodiments, the virtual machine manager may synchronize the local DMA buffer with information from a corresponding DMA buffer on the remote machine in response to detection of a local read operation on the DMA buffer read from the virtual machine.

In embodiments, the virtual machine manager may synchronize the local DMA buffer with all content stored in the corresponding DMA buffer on the remote machine.

In embodiments, the stub driver may include a peripheral component interconnect (PCI) card driver.

In embodiments, the resource may include one or more of a graphical processing unit, a display port, a display, a user interface, a communications device, an audio device, or a storage device.

According to various example embodiments, a method for a local machine to access a resource on a remote machine may include hosting, by a virtual machine manager of the local machine, a virtual machine having a device driver, and obtaining, by the virtual machine manager, from a stub driver on the remote machine, information about the resource on the remote machine, wherein the resource on the remote machine is bound to the stub driver on the remote machine. The method may also include instantiating, by the virtual machine manager, a virtual resource on the local machine corresponding to the resource on the remote machine, and collaborating, by the virtual machine manager, with the stub driver on the remote machine to effectuate a real access to the resource on the remote machine for an access to the virtual resource by the device driver on behalf of a program on the local machine.

In embodiments, the resource may be an I/O device, and obtaining information about the I/O device may include obtaining, by the virtual machine manager, from the stub driver, information about I/O address space of the I/O device, and creating on the local machine, by the virtual machine manager, a shadow copy of the I/O address space of the I/O device to facilitate I/O address space based access of the I/O device by the device driver.

In embodiments, the method may include executing, by the virtual machine manager, an initialization routine of the device driver on the local machine to effectively initialize the I/O device for access based on the shadow copy of the I/O address space.

In embodiments, the resource may include an I/O device, and the method may include capturing, by the virtual machine manager, an I/O instruction issued by the virtual machine, transmitting, by the virtual machine manager, the I/O instruction to the stub driver to operate on the I/O device to obtain an I/O result, and receiving, by the virtual machine manager, the I/O result from the stub driver.

In embodiments, the method may include pausing, by the virtual machine manager, the virtual machine after capturing the I/O instruction.

In embodiments, the resource may include an I/O device, and wherein the method may include receiving, by the virtual machine manager, from the stub driver, an interrupt notification of the I/O device.

In embodiments, the resource may include an I/O device, and collaborating may include allocating, by the virtual machine manager, a local direct memory access (DMA) buffer on the local machine to facilitate DMA access based I/O by the device driver, and synchronizing, by the virtual machine manager, in cooperation with the stub driver, the local DMA buffer with a corresponding DMA buffer of the remote machine.

In embodiments, collaborating may include caching, by the virtual machine manager, write access operations of the virtual machine on the local DMA buffer, and transmitting, by the virtual machine manager, the cached write access operations in response to either transferring DMA access associated data between the virtual machine and the I/O device or receiving from the stub driver a DMA access associated interrupt notification of the I/O device.

In embodiments, collaborating may include pausing, by the virtual machine manager, operation of the virtual machine when the cached write access operations are transmitted, and resuming, by the virtual machine manager, operation of the virtual machine in response to receipt of a synchronize notification from the stub driver that indicates that the corresponding DMA buffer of the remote machine has been synchronized with the local DMA buffer.

In embodiments, synchronizing may include copying all buffered data of the corresponding DMA buffer of the remote machine, in response to detecting an attempt by the virtual machine to read the local DMA buffer.

According to various embodiments, a system may include a local computing machine. The local computing system may include system memory, a communication interface, and one or more processors configured to perform any method of the disclosed embodiments.

According to various example embodiments, a computer readable medium may have a number of instructions configured to enable a machine having a number of resources, in response to execution of the instructions by the machine, to provide a stub driver to facilitate access of the resources by another machine, the stub driver to bind the stub driver to a first of the resources, detect one or more additional resource coupled to the first resource, obtain configuration information for the one or more additional resources, and collaborate with a virtual machine manager of the machine to effectuate a real access to one or more of the resources by a program on the other machine.

In embodiments, the resource may include an I/O device, and collaborating may include collaboration to facilitate I/O address space based access of the I/O device.

In embodiments, the resource may include an I/O device, and collaborating may include collaboration to facilitate direct memory access (DMA) based access of the I/O device.

In embodiments, the resource may include an I/O device, and collaborating may include routing of interrupts of the I/O device to the other machine.

In embodiments, the I/O device may be a peripheral component interconnect (PCI) enabled device or a PCI-express enabled device.

What is claimed is:

1. A non-transitory computer readable medium having a plurality of instructions stored thereon, wherein the instructions, when executed by a local machine, provide the local machine with a virtual machine manager to:
host and manage a virtual machine on the local machine, wherein the virtual machine includes a device driver;
obtain information about a resource on a remote machine from a stub driver on the remote machine, wherein the resource on the remote machine is bound to the stub driver on the remote machine;
instantiate a virtual resource on the local machine corresponding to the resource on the remote machine; and
collaborate with the stub driver on the remote machine to effectuate a real access to the resource on the remote machine upon an access to the virtual resource by the device driver on behalf of a program on the local machine, wherein to collaborate includes to allocate a local direct memory access (DMA) buffer on the local machine to facilitate DMA based input/output (I/O) by the device driver and to synchronize, in cooperation with the stub driver, the local DMA buffer with a corresponding DMA buffer of the remote machine.

2. The non-transitory computer readable medium of claim 1, wherein the resource comprises an I/O device, and wherein obtain information about the I/O device comprises obtain configuration information about the I/O device from the stub driver.

3. The non-transitory computer readable medium of claim 2, wherein the virtual machine manager is further to create on the local machine a shadow copy of an I/O address space of the I/O device based on the obtained information, to facilitate I/O address space-based access of the I/O device.

4. The non-transitory computer readable medium of claim 3, wherein the virtual machine manager is further to execute an initialization routine of the device driver on the local machine to effectively initialize the I/O device for access, based at least in part on the shadow copy of the I/O address space.

5. The non-transitory computer readable medium of claim 2, wherein the virtual machine manager is further to:
capture an I/O instruction issued by the virtual machine;
transmit the I/O instruction to the stub driver for operation on the I/O device to obtain an I/O result; and
receive the I/O result from the stub driver.

6. The non-transitory computer readable medium of claim 2, wherein the virtual machine manager is further to:
receive, from the stub driver, an interrupt notification of the I/O device.

7. The non-transitory computer readable medium of claim 6, wherein the virtual machine manager is further to cause the device driver to interrupt the virtual machine, in response to receipt of the interrupt notification of the I/O device.

8. The non-transitory computer readable medium of claim 7, wherein the virtual machine manager interrupts the virtual machine in a manner that enables the virtual machine to handle the interrupt notification of the I/O device as if the I/O device was directly connected to a local bus of the local machine.

9. The non-transitory computer readable medium of claim 7, wherein the virtual machine manager is further to transmit a disable instruction to the stub driver to temporarily disable interrupts on the remote machine, in response to receipt of the interrupt notification of the I/O device.

10. The non-transitory computer readable medium of claim 1, wherein the virtual machine manager is further to:
cache write access operations on the local DMA buffer; and
transmit the cached write access operations to the stub driver, in response to either a DMA associated data transfer between the virtual machine and an I/O device or receipt of a DMA associated interrupt notification of the I/O device from the stub driver.

11. The non-transitory computer readable medium of claim 10, wherein the virtual machine manager is further to:
pause operation of the virtual machine after the cached write access operations on the DMA buffer are transmitted; and
resume operation of the virtual machine in response to receipt of a synchronize notification from the stub driver that indicates that the corresponding DMA buffer on the remote machine has been synchronized with the local DMA buffer.

12. A method for a local machine to access a resource on a remote machine, comprising:
hosting, by a virtual machine manager of the local machine, a virtual machine having a device driver;
obtaining, by the virtual machine manager, from a stub driver on the remote machine, information about the resource on the remote machine, wherein the resource on the remote machine is bound to the stub driver on the remote machine;

instantiating, by the virtual machine manager, a virtual resource on the local machine corresponding to the resource on the remote machine;

allocating, by the virtual machine manager, a local direct memory access (DMA) buffer on the local machine to facilitate DMA based input/output (I/O) the device driver; and synchronizing, by the virtual machine manager, in cooperation with the stub driver, the local DMA buffer with a corresponding DMA buffer of the remote machine to effectuate a real access to the resource on the remote machine upon an access to the virtual resource by the device driver on behalf of a program on the local machine.

13. The method of claim 12, wherein the resource is an I/O device, and wherein obtaining information about the I/O device includes:

obtaining, by the virtual machine manager, from the stub driver, information about I/O address space of the I/O device; and creating on the local machine, by the virtual machine manager, a shadow copy of the I/O address space of the I/O device to facilitate I/O address space based access of the I/O device by the device driver.

14. The method of claim 13, further comprising:

executing, by the virtual machine manager, an initialization routine of the device driver on the local machine to effectively initialize the I/O device for access based on the shadow copy of the I/O address space.

15. The method of claim 12, wherein the resource comprises an I/O device, and wherein the method further includes:

capturing, by the virtual machine manager, an I/O instruction issued by the virtual machine;

transmitting, by the virtual machine manager, the I/O instruction to the stub driver to operate on the I/O device to obtain an I/O result; and receiving, by the virtual machine manager, the I/O result from the stub driver.

16. The method of claim 12, wherein the resource comprises an I/O device, and wherein the method further includes receiving, by the virtual machine manager, from the stub driver, an interrupt notification of the I/O device.

17. The method of claim 12, further including:

caching, by the virtual machine manager, write access operations of the virtual machine on the local DMA buffer; and transmitting, by the virtual machine manager, the cached write access operations in response to either transferring DMA associated data between the virtual machine and an I/O device or receiving from the stub driver a DMA associated interrupt notification of the I/O device.

18. The method of claim 17, wherein collaborating further comprises:

pausing, by the virtual machine manager, operation of the virtual machine when the cached write access operations are transmitted; and resuming, by the virtual machine manager, operation of the virtual machine in response to receipt of a synchronize notification from the stub driver that indicates that the corresponding DMA buffer of the remote machine has been synchronized with the local DMA buffer.

19. The method of claim 12, wherein synchronizing includes copying all buffered data of the corresponding DMA buffer of the remote machine, in response to detecting an attempt by the virtual machine to read the local DMA buffer.

20. A non-transitory computer readable medium having a plurality of instructions stored thereon, wherein the instructions, when executed, are to provide a stub driver on a first machine having a plurality of resources to facilitate access to the resources by a second machine, the stub driver to:

bind the stub driver to a first of the resources;

detect one or more additional resource coupled to the first resource;

obtain configuration information for the one or more additional resources; allocate a local direct memory access (DMA) buffer on the local machine to facilitate DMA based input/output (I/O) by the device driver; and synchronize, in cooperation with the stub driver, the local DMA buffer with a corresponding DMA buffer of the remote machine to effectuate a real access to one or more of the plurality of resources of the first machine by a program on the second machine.

21. The non-transitory computer readable medium of claim 20, wherein the one or more of the plurality of resources comprises an I/O device, and wherein to synchronize in cooperation with the stub driver is to facilitate I/O address space based access of the I/O device.

* * * * *